United States Patent
Olsen

(10) Patent No.: US 6,735,952 B2
(45) Date of Patent: May 18, 2004

(54) SINGLE PUMP LUBRICATION AND STARTER SYSTEM

(75) Inventor: Andrew J. Olsen, Amesbury, MA (US)

(73) Assignee: Ingersoll-Rand Energy Systems, Portsmouth, NH (US)

( * ) Notice: Subject to any disclaimer, the term of this patent is extended or adjusted under 35 U.S.C. 154(b) by 0 days.

(21) Appl. No.: 10/238,526

(22) Filed: Sep. 10, 2002

(65) Prior Publication Data

US 2003/0059294 A1 Mar. 27, 2003

Related U.S. Application Data

(60) Provisional application No. 60/325,083, filed on Sep. 26, 2001.

(51) Int. Cl.[7] ............................. F02C 7/06; F02C 7/277
(52) U.S. Cl. ............................ 60/778; 60/39.08; 60/788
(58) Field of Search ............................. 60/39.08, 778, 60/786, 787, 788

(56) References Cited

U.S. PATENT DOCUMENTS

| | | | |
|---|---|---|---|
| 2,711,071 A | * 6/1955 | Frankel | 60/788 |
| 3,472,024 A | * 10/1969 | Straub et al. | 60/39.08 |
| 3,475,907 A | * 11/1969 | Kellett | 60/39.08 |
| 4,068,468 A | 1/1978 | Wood et al. | |
| 4,211,070 A | * 7/1980 | Portmann | 60/39.08 |
| 6,064,122 A | 5/2000 | McConnell | |
| 6,281,596 B1 | 8/2001 | Gilbreth et al. | |

* cited by examiner

Primary Examiner—Louis J. Casaregola
(74) Attorney, Agent, or Firm—Michael Best & Friedrich LLP

(57) ABSTRACT

The invention recites a microturbine system comprising a housing and a turbine including a rotary element having a shaft supported by the housing and rotatable about a rotary axis. A starter wheel is coupled to the shaft and rotatable in response to a stream of high-pressure fluid flowing from a high-pressure flow path. A pump is operable to provide a supply of lubricating fluid. The engine further includes a starter valve receiving the supply of lubricating fluid and being selectively operable to provide one of the stream of high-pressure fluid to the high-pressure flow path and a stream of low-pressure fluid to a low-pressure flow path.

19 Claims, 2 Drawing Sheets

SINGLE PUMP LUBRICATION AND STARTER SYSTEM

RELATED APPLICATION DATA

This application claims benefit under 35 U.S.C. Section 119(e) of U.S. Provisional Application No. 60/325,083 filed Sep. 26, 2001.

BACKGROUND AND SUMMARY OF THE INVENTION

The present invention relates to turbine engines, and particularly to microturbine engines. More particularly, the present invention relates to microturbine engines having lubrication oil systems.

Microturbine engines are used to generate electricity or to provide power for other rotating equipment. Microturbine engines often include two turbines, however single turbine systems are also used. In the two-turbine system, the first turbine, or gasifier turbine, rotates under the influence of a flow of products of combustion to drive a compressor. The compressor provides a supply of compressed air for combustion within a combustor. The products of combustion leaving the combustor drive the gasifier turbine and then flow to a power turbine that drives a generator or other piece of equipment.

The gasifier turbine and compressor may reside on the same shaft. The shaft is generally supported by high-speed bearings that use lubricating oil for cooling and lubrication. The power turbine as well as any associated gearing may also require a supply of lubricating oil. Thus, microturbine engine systems generally include a lubrication oil system that is capable of providing a low-pressure supply of lubricating oil to various components.

Starting a microturbine engine requires an outside energy supply to initiate rotation of the gasifier turbine and the compressor. The compressor is then able to supply compressed air to the combustor to initiate combustion and start the engine. In single turbine systems connected to a generator, it is sometimes possible to operate the generator as a motor to start the engine. However, in two-turbine systems, the gasifier turbine is not directly coupled to the generator. Therefore, an additional power supply is required. Some systems employ a gear coupled to the gasifier shaft and driven by an external motor during start-up. The addition of a gear to the gasifier shaft is undesirable due to the high speed of the shaft and the dynamic instabilities of the rotor. Also, having the starting system physically contact the shaft during operation can create a drag on the system, which results in inefficiencies. It is therefore desirable to provide a system capable of quickly accelerating the gasifier turbine to start-up speed without the addition of complicated or expensive hardware. It is also desirable to provide a system that is not in physical contact with the gasifier turbine during operation.

Thus, according to the present invention, a microturbine engine provides a housing and a turbine including a rotary element having a shaft supported by the housing and rotatable about a rotary axis. A starter wheel is coupled to the shaft and rotatable in response to a stream of high-pressure fluid flowing from a high-pressure flow path. A pump is operable to provide a supply of lubricating fluid. The engine further includes a starter valve receiving the supply of lubricating fluid and being selectively operable to provide one of the stream of high-pressure fluid to the high-pressure flow path and a stream of low-pressure fluid to a low-pressure flow path.

The invention further provides a method of starting a microturbine engine having a compressor supported for rotation and having a starter wheel coupled to the compressor. The method comprises the acts of providing a supply of lubricating fluid with a constant displacement pump and providing a starter valve in fluid communication with the pump, the valve receiving the supply of lubricating fluid from the pump. The method further includes the steps of operating the starter valve to provide a high-pressure stream of fluid and directing the high-pressure stream to impinge upon the starter wheel to begin rotation of the compressor until the engine has started. The method also includes the steps of operating the starter valve to provide a low-pressure stream of fluid and directing at least a portion of the low-pressure stream to the microturbine engine to provide lubrication.

In preferred embodiments, a solenoid operated starter valve operates to redirect flow from the lubrication oil pump to the high-pressure flow path. The high-pressure flow path includes a pressure control valve that directs a portion of the high-pressure stream to the low-pressure flow path at a lower pressure while maintaining the desired pressure within the high-pressure flow path. The high-pressure oil flows through a nozzle and into a Pelton wheel attached to the gasifier turbine shaft. The Pelton wheel rotates in response to the oil flow accelerating the turbine and compressor. Once the engine is started, the starter valve solenoid de-energizes redirecting the oil flow through the low-pressure system at the desired lubricating oil pressure.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
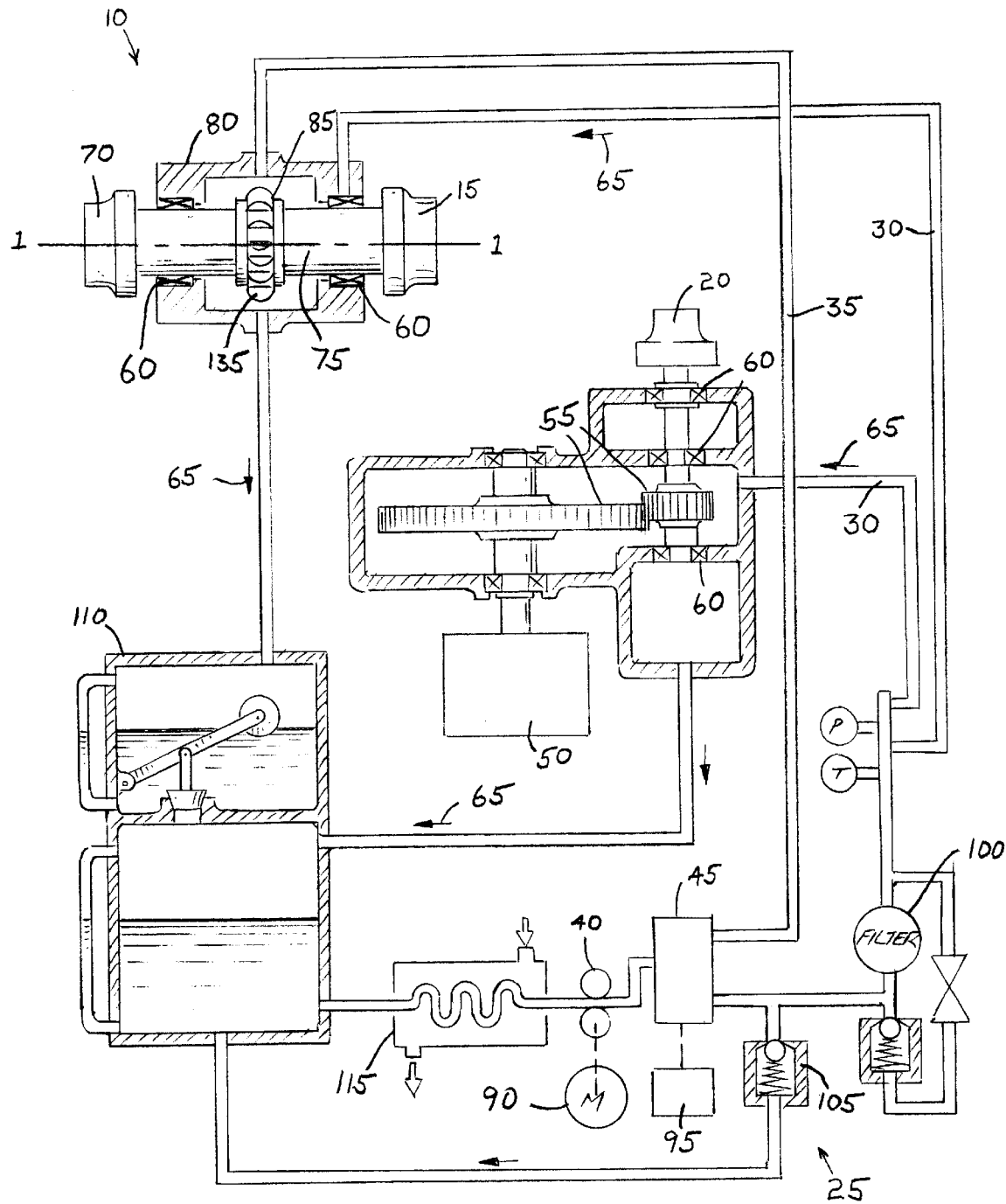
FIG. 1 is a schematic representation of a microturbine engine having a lubrication and starter oil system in accordance with the present invention.

FIG. 1 is a schematic representation of a microturbine engine 10 including a gasifier turbine 15, a power turbine 20, and a lubricating oil system 25 having a low-pressure flow path 30, a high-pressure flow path 35, a lubrication oil pump 40, and a starter valve 45. The power turbine 20, supported vertically, drives a generator 50 through a series of gears 55. The gearing allows the power turbine 20 to rotate at a high operating speed while the generator 50 rotates at the speed necessary to produce usable power (e.g. 3,600 rpm or 1,800 rpm for 60 Hz. and 3,000 rpm or 1,500 rpm for 50 Hz.). The power turbine 20 and the generator 50 are supported for rotation by bearings 60. The bearings 60 and the gears 55 receive a flow of lubricating oil 65 from the low-pressure flow path 30 to prevent overheating and to maintain lubrication and reduce wear.

The gasifier turbine 15 and a compressor 70 are supported for rotation about a rotary axis 1—1 by a gasifier shaft 75. Other embodiments (not shown) use a compressor 70 on a separate shaft than the gasifier turbine 15 or a compressor 70 that is indirectly driven, however, a single shaft 75 supporting both the turbine 15 and the compressor 70 is preferred. A housing 80 supports two bearings 60 that in turn support the gasifier shaft 75. A starter wheel 85, preferably a Pelton wheel, disposed within the housing 80 is fixedly mounted to the gasifier shaft 75 for rotation therewith.

The oil pump 40 is driven by an external power source (e.g., an internal combustion engine or electric motor) such as a motor 90. The pump 40 is a constant displacement gear pump in preferred embodiments, however screw pumps or other types of pumps may function with the invention. During engine operation, the pump 40 provides a constant supply of low-pressure oil for the lubricating oil system 25. The oil flows from the pump 40 to the starter valve 45. The starter valve 45 provides access to two possible flow paths, the low-pressure flow path 30 and the high-pressure flow path 35. In preferred embodiments a solenoid 95 operates the valve 45, moving it between these two positions, however, other operating mechanisms are possible (e.g., motor, hand-operated, oil-operated, etc.). Preferably, in the de-energized state the solenoid 95 positions the valve 45 to direct flow to the low-pressure flow path 30, while energizing the solenoid 95 moves the valve 45 to direct flow to the high-pressure flow path 35.

With the solenoid 95 in the de-energized state, the flow of lubricating oil 65 passes through the valve 45 along the low-pressure flow path 30 toward an oil filter 100. A pressure-regulating valve 105 routes excess oil back to an oil tank 110 and regulates the pressure within the low-pressure flow path 30. The low-pressure oil then flows to the gears 55, bearings 60, and any other components requiring lubrication or cooling. The oil collects at the point of use and flows (e.g., under the influence of gravity) back to the oil tank 110. The oil tank 110 allows the oil to settle and de-aerate before reuse. Before the oil reenters the oil pump 40, it passes through an oil cooler 115 that assures that the oil flowing to the pump 40 is at or below the optimum temperature. It should be noted that the oil cooler 115 can be positioned anywhere in the low-pressure oil system. In preferred constructions, the oil cooler 115 is positioned immediately upstream or downstream of the oil filter 100.

Figure 2:
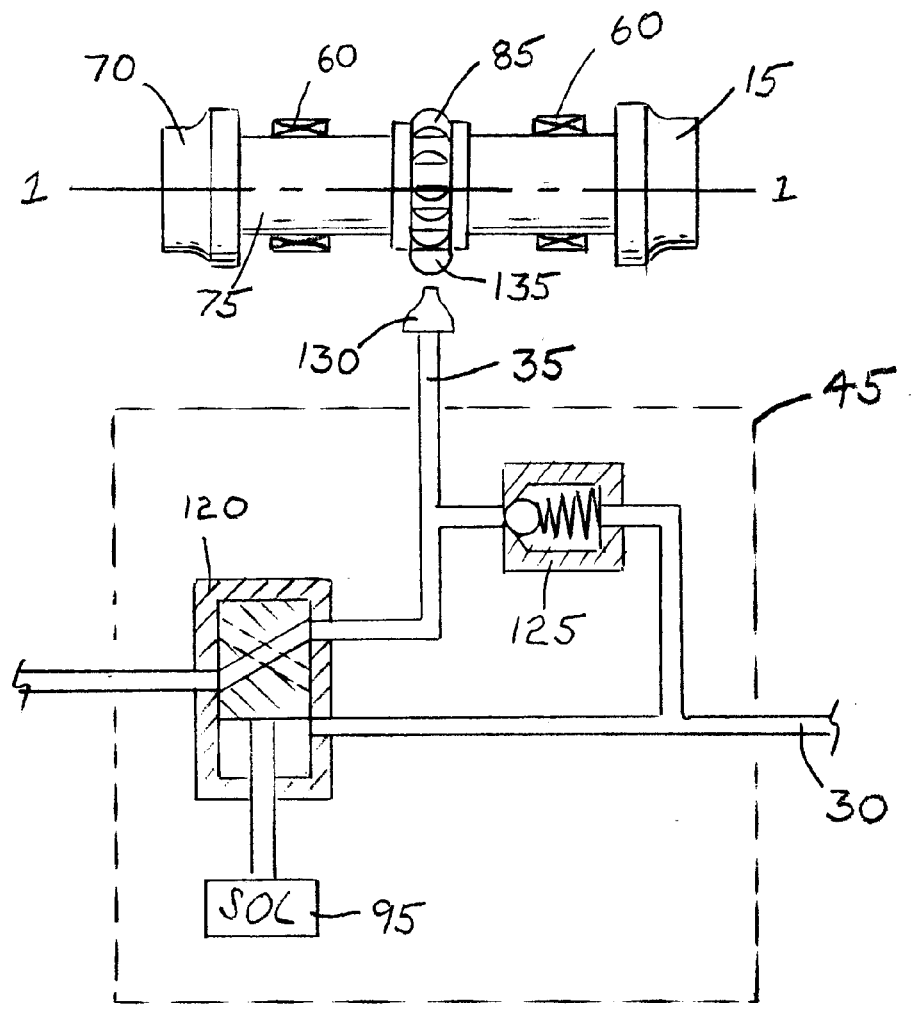
FIG. 2 is a more detailed schematic representation of the starter valve of FIG. 1.

With the solenoid 95 in the energized state, the flow of lubricating oil 65 passes through the valve 45 along the high-pressure flow path 35 toward the starter wheel 85. Referring to FIG. 2, the starter valve 45 includes a flow control valve 120 and a pressure-regulating valve 125. While two separate valves 120, 125 are illustrated, a single flow control valve that also regulates pressure could be employed. Therefore, the invention should not be limited to a two-position flow control valve 120 and a separate pressure-regulating valve 125. The flow control valve 120 directs the flow of lubricating oil 65 to the high-pressure flow path 35. The pressure-regulating valve 125 passes excess oil to the low-pressure flow path 30 to maintain the desired pressure within the high-pressure flow path 35. The excess oil flows along the low-pressure path 30 as described above. The high-pressure oil flows to the housing 80, passes through a nozzle 130, and strikes the buckets 135 of the starter wheel 85. The nozzle design converts the pressure of the high-pressure flow into velocity, resulting in a high velocity stream of oil exiting the nozzle 130. The used oil collects in the gasifier housing 80 and flows back to the oil tank 110. The term high-pressure oil as used herein refers to oil at a pressure in the range of approximately 500 psi to 5,000 psi, while low pressure oil refers to oil having a pressure of no more than 150 psi.

The nozzle 130 and starter wheel 85 are designed to produce a high-velocity stream of oil and to quickly accelerate the gasifier shaft 75 up to a speed sufficient to allow the compressor 70 to provide compressed air of suitable pressure and quantity to start the engine 10. The nozzle passage is typically contoured to produce an exit velocity of at least 500 in/sec., with lower velocities suitable for small or slow rotating microturbines (e.g., microturbines operating below 5,000 rpm). To improve the dynamic stability of the gasifier turbine 15, multiple nozzles 130 may be employed. Multiple nozzles 130 could balance any lateral forces applied, while simultaneously changing the pulse frequency applied to the starter wheel 85. Due to the high speed of the gasifier turbine 15, it must accelerate through several critical speeds. A person having ordinary skill in the art will realize that the system should accelerate the turbine 15 through these critical speeds as smoothly and quickly as possible, while avoiding a pulse frequency that corresponds with the system mode frequencies. In another embodiment (not shown), multiple nozzles 130 are employed at varying angles around the starter wheel 85. By varying the rotational angle between nozzles 130, sympathetic vibration is avoided or minimized.

To achieve the high pressure and in turn the high velocity, the nozzle 130 restricts the volume of oil that can pass by providing a small exit flow area when compared to the low-pressure oil flow path 30. Constant displacement pumps provide a fixed volume of oil based on the speed of the pump. Therefore, the nozzle 130 is designed to pass less flow than the pump 40 provides. Because oil is an incompressible fluid, the oil pressure within the high-pressure flow path 35 will rise quickly. The pressure-regulating valve 125 allows the excess oil provided by the pump 40 to pass, while maintaining the desired pressures within the high-pressure flow path 35. Suitable pressure for starting the gasifier turbine 15 and compressor 70 ranges from 1,500 psi to 4,000 psi, however higher or lower pressures may function under certain conditions. Pumps 40 such as gear pumps are capable of safely operating in this backpressure condition for short periods to start the microturbine engine 10. Other embodiments (not shown) may include a safety valve capable of operating to prevent excessive pressure and damage to the components during operation in the start-up mode.

It should be noted that oil was described as the lubricating fluid throughout the above description. However, a person having ordinary skill in the art will realize that the system will function using any fluid that is capable of providing the necessary cooling and lubrication. Therefore, the system should not be limited to oil alone.

Although the invention has been described in detail with reference to certain preferred embodiments, variations and modifications exist within the scope and spirit of the invention as described and defined in the following claims.

What is claimed is:

1. A microturbine system comprising:
   a housing;
   a turbine including a rotary element having a shaft supported by the housing and rotatable about a rotary axis;
   a starter wheel coupled to the shaft and rotatable in response to a stream of high-pressure fluid flowing from a high-pressure flow path;
   a pump operable to provide a supply of lubricating fluid; and
   a starter valve receiving the supply of lubricating fluid and selectively operable to provide one of the stream of high-pressure fluid to the high-pressure flow path and a stream of low-pressure fluid to a low-pressure flow path.

2. The microturbine system of claim 1, wherein the starter valve is operable between a first position at which the supply of lubricating fluid is directed to the low-pressure flow path as a stream of low-pressure fluid and a second position at which a portion of the lubricating fluid is directed to the high-pressure flow path as a stream of high-pressure fluid and the remainder is directed to the low-pressure flow path as a stream of low-pressure fluid.

3. The microturbine system of claim 1, wherein the starter valve includes a pressure regulating valve operable to maintain the high-pressure flow between 500 pounds per square inch and 5,000 pounds per square inch.

4. The microturbine engine of claim 1, wherein the starter wheel is a Pelton wheel.

5. The microturbine engine of claim 1, wherein the high-pressure flow path includes a nozzle having a nozzle passage, wherein the nozzle passage is contoured to produce a nozzle exit velocity of at least 500 inches per second.

6. The microturbine system of claim 1, further comprising a compressor including a rotary element having a shaft, the shaft of the compressor rotary element being connected to the shaft of the turbine rotary element, the compressor rotary element and turbine rotary element supported by bearings, the bearings receiving a portion of the stream of low-pressure fluid for lubrication.

7. The microturbine system of claim 6, wherein the compressor rotary element shaft and the turbine rotary element shaft comprise a single gasifier shaft.

8. The microturbine system of claim 1, wherein the pump is a constant displacement pump.

9. The microturbine system of claim 8, wherein the constant displacement pump is a rotary gear pump.

10. A combustion turbine engine comprising:
   a compressor including a rotary element having a shaft rotatable to provide a flow of compressed air;
   a combustor receiving the flow of compressed air and combusting it with a flow of fuel to produce a flow of hot combustion gas;
   a turbine including a rotary element having a shaft and being coupled to the compressor rotary element, the turbine receiving the flow of hot combustion gas and discharging a flow of exhaust gas, the turbine rotary element and compressor rotary element rotating in response to the flow of combustion gas through the turbine;
   a housing rotatably supporting the compressor rotary element and the turbine rotary element;
   a starter wheel on the compressor rotary element;
   a pump operable to provide a flow of lubricating fluid; and
   a starter valve positioned to receive the flow of lubricating fluid and selectively operable to provide one of a high-pressure stream of fluid to a high-pressure flow path and a low-pressure stream of fluid to a low-pressure flow path;
   wherein the high-pressure flow path directs the lubricating fluid against the starter wheel to initiate operation of the compressor, and the low-pressure flow path directs the lubricating fluid to frictional elements of the engine.

11. The microturbine system of claim 10, wherein the starter valve is operable between a first position at which all of the flow of lubricating fluid is directed to the low-pressure flow path as a low-pressure stream of fluid, and a second position at which a portion of the flow of lubricating fluid is directed to the high-pressure flow path as a high-pressure stream of fluid and the remainder of the flow of lubricating fluid is directed to the low-pressure flow path as a low-pressure stream of fluid.

12. The microturbine engine of claim 10, wherein the starter wheel is a Pelton wheel.

13. The microturbine system of claim 10, wherein the starter valve includes a pressure regulating valve operable to maintain the high-pressure flow between 500 pounds per square inch and 5,000 pounds per square inch.

14. The microturbine system of claim 10, wherein the compressor rotary element shaft and the turbine rotary element shaft are a single gasifier shaft.

15. The microturbine system of claim 10, wherein the pump is a constant displacement pump.

16. The microturbine system of claim 15, wherein the constant displacement pump is a rotary gear pump.

17. The microturbine engine of claim 10, wherein the high-pressure flow path includes a nozzle having a nozzle passage, wherein the nozzle passage is contoured to produce a nozzle exit velocity of at least 500 inches per second.

18. A method of starting a microturbine engine having a compressor supported for rotation and having a starter wheel coupled to the compressor, the method comprising the acts of:
   providing a supply of lubricating fluid with a constant displacement pump;
   providing a starter valve in fluid communication with the pump, the valve receiving the supply of lubricating fluid from the pump;
   operating the starter valve to provide a high-pressure stream of fluid;
   directing the high-pressure stream to the starter wheel to begin rotation of the compressor until the engine has started;
   operating the starter valve to provide a low-pressure stream of fluid; and
   directing at least a portion of the low-pressure stream to the microturbine engine to provide lubrication.

19. The method of claim 18, wherein the operating the starter to provide a high-pressure stream step further includes simultaneously providing a low-pressure stream of fluid to the microturbine engine to provide lubrication.

* * * * *